United States Patent [19]

Saint-Lot

[11] 4,028,624
[45] June 7, 1977

[54] ELECTRONIC SWITCHING ARRANGEMENT FOR A HOMING AND TRAFFIC RADIO SYSTEM

[75] Inventor: Armand Saint-Lot, Paris, France
[73] Assignee: Thomson-CSF, Paris, France
[22] Filed: Mar. 10, 1976
[21] Appl. No.: 665,392
[30] Foreign Application Priority Data
   Mar. 11, 1975   France ................................ 75.07521
[52] U.S. Cl. ................................ 325/23; 343/113 R
[51] Int. Cl.² ........................................... H04B 1/52
[58] Field of Search ................. 325/21, 22, 23, 18, 325/24; 343/100 R, 100 AD, 100 CS, 100 SA, 112 R, 113 R, 115, 117 A, 176, 180, 810, 816, 850, 853, 893; 333/24.2, 6, 9

[56] References Cited
UNITED STATES PATENTS 3,202,986   8/1965   Cordry ........................... 343/893 X
3,329,897   7/1967   Preble ................................. 325/21

*Primary Examiner*—Benedict V. Safourek
*Attorney, Agent, or Firm*—Karl F. Ross; Herbert Dubno

[57] ABSTRACT

A switching arrangement which, in conjunction with a single radiating arrangement comprising two antennas, allows multiple functions to be provided, in particular reversals and switching operations corresponding to the operating modes represented by homing radio direction-finding and traffic radio transmission and reception. The arrangement has switching devices, a phase-shifting element and a $0 - \pi$ hybrid junction, to produce two paths which start from two terminals connecting it to associated radiating antennas and run to a third terminal for connecting it to a transmitter/receiver, so that the paths are of the same electrical length in the traffic mode of operation and are out of phase by $(2\pi D)/\lambda + \pi$ in the homing mode, $\lambda$ being the wavelength and D the distance between the said antennas predetermined at most equal to a quarter of the minimum wavelength of the operating band.

8 Claims, 12 Drawing Figures

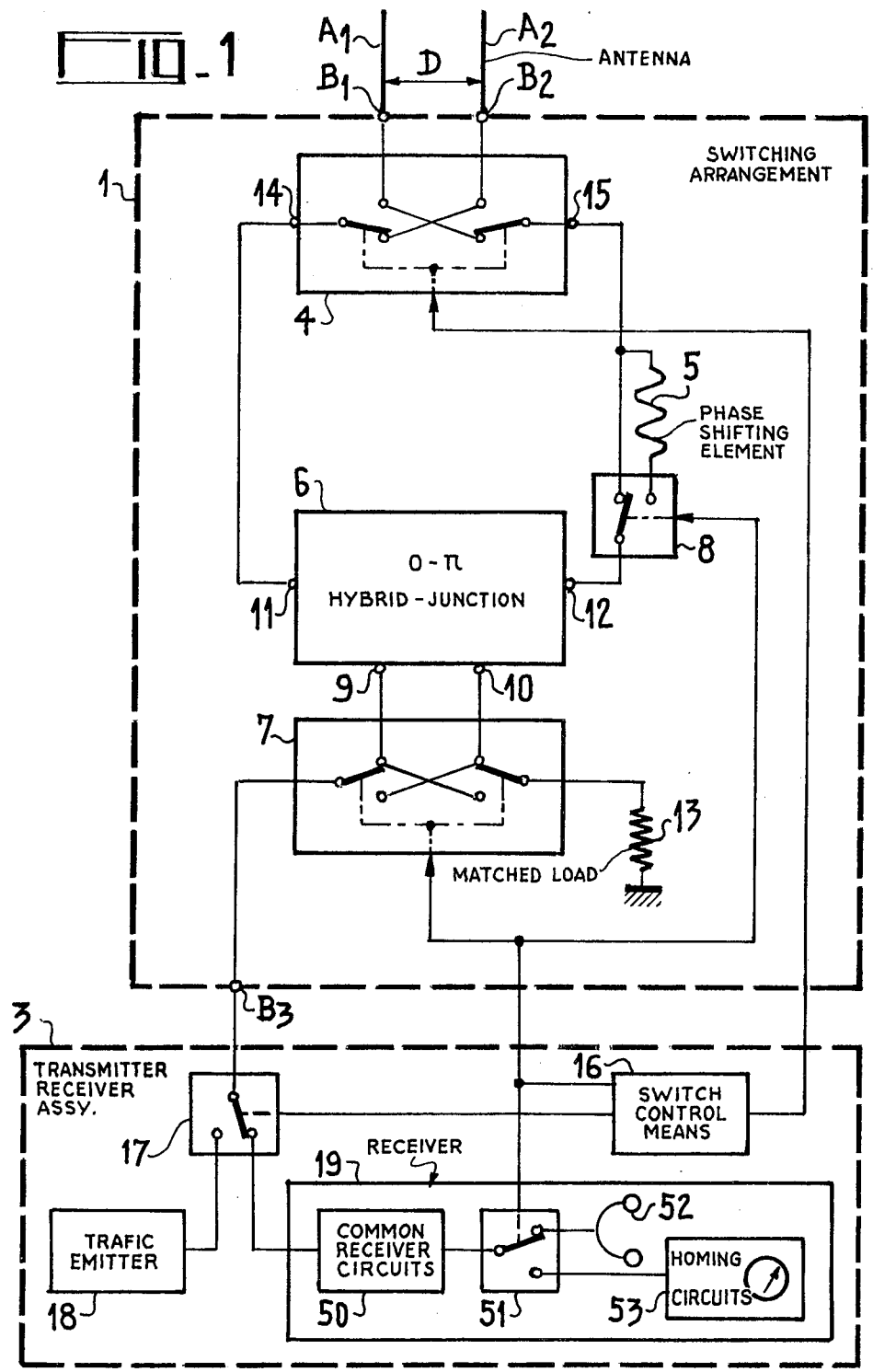

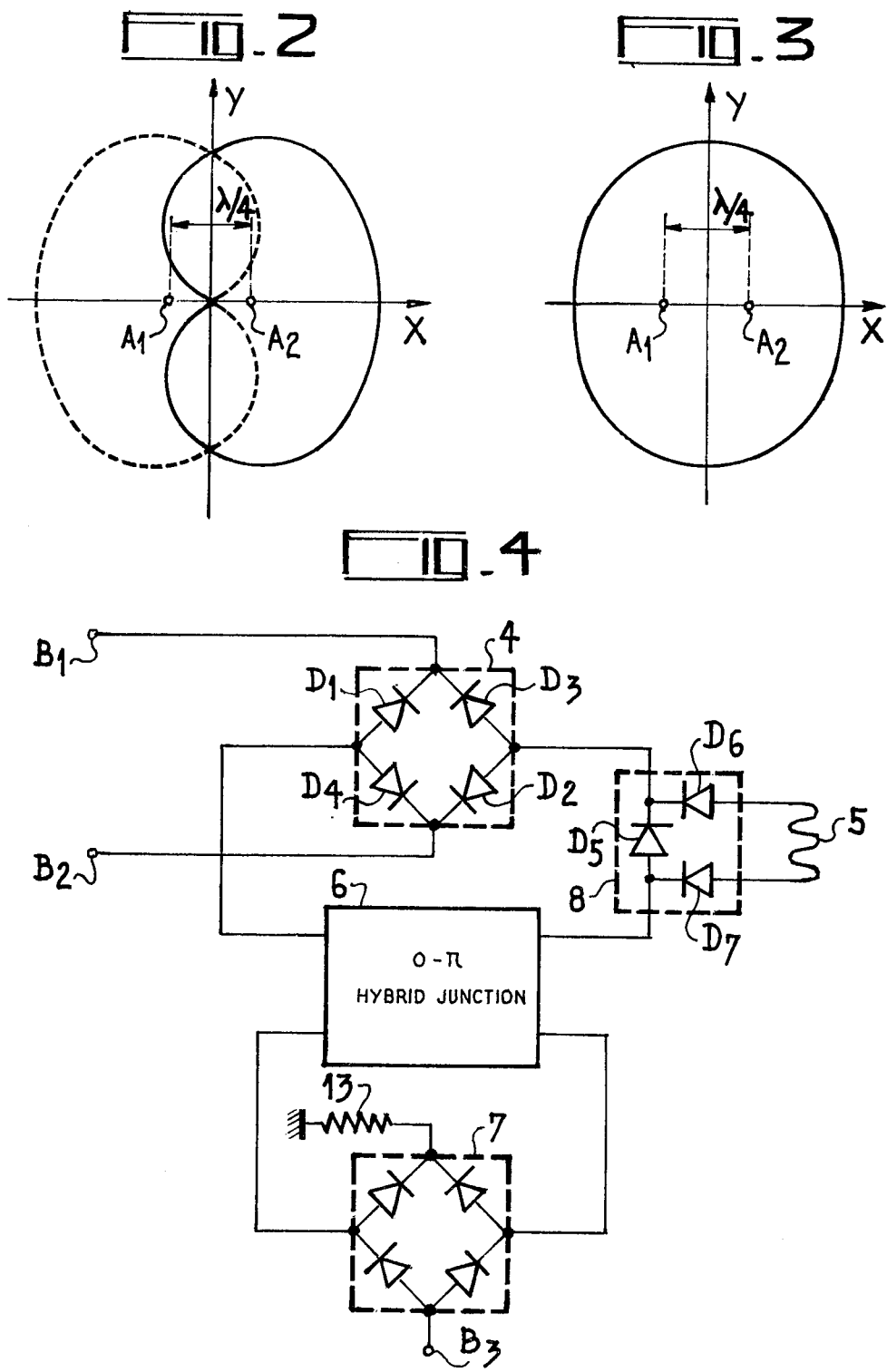

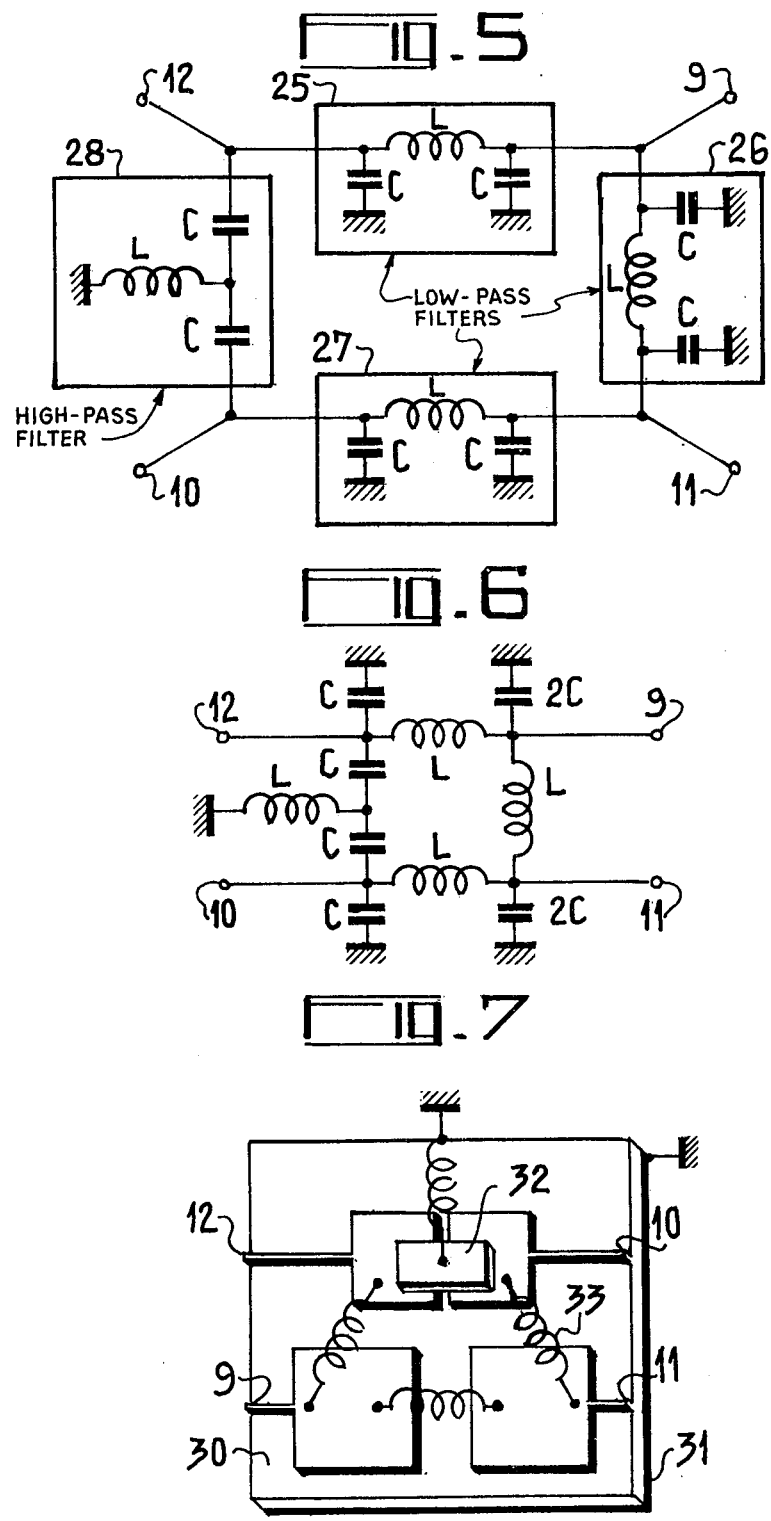

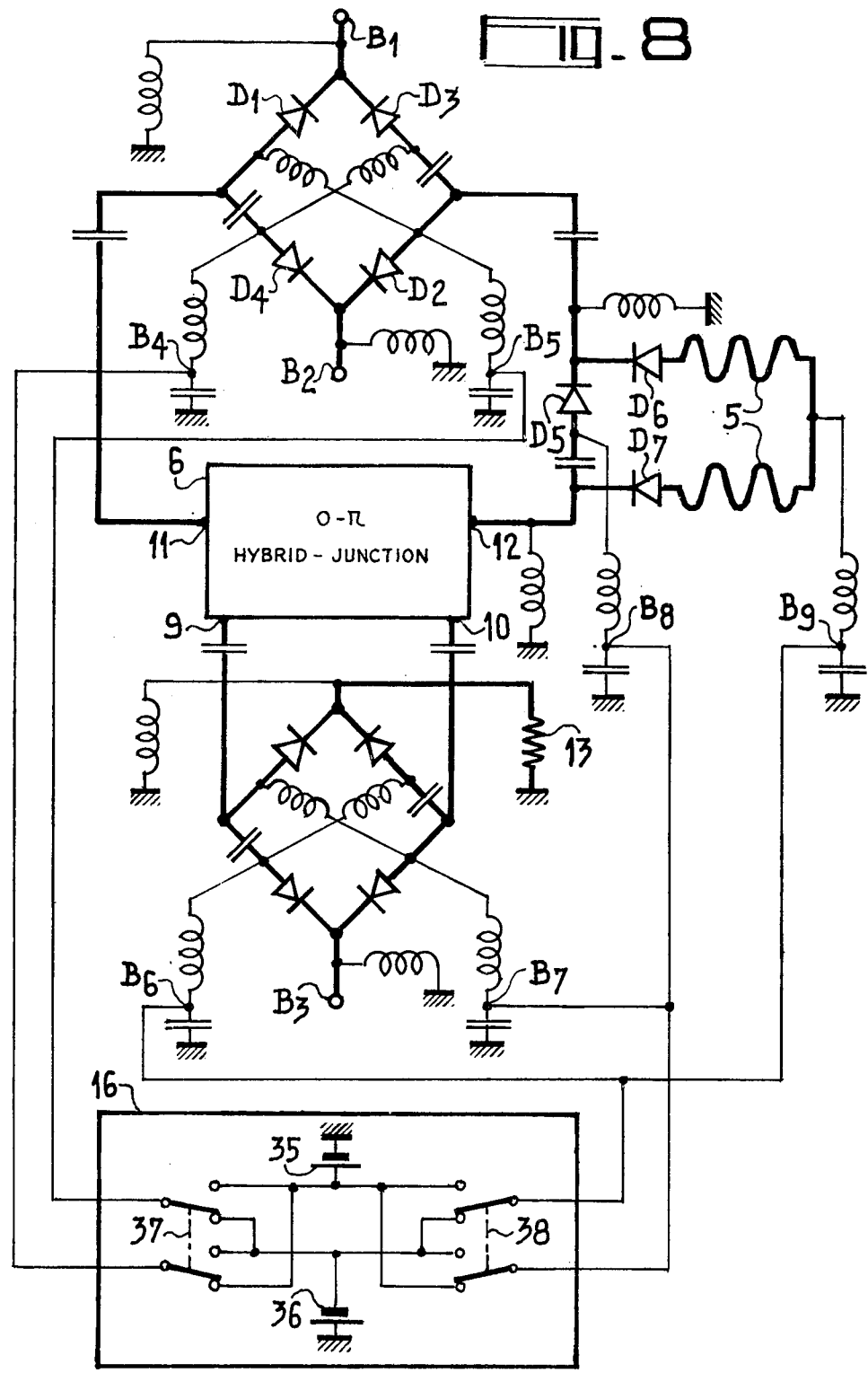

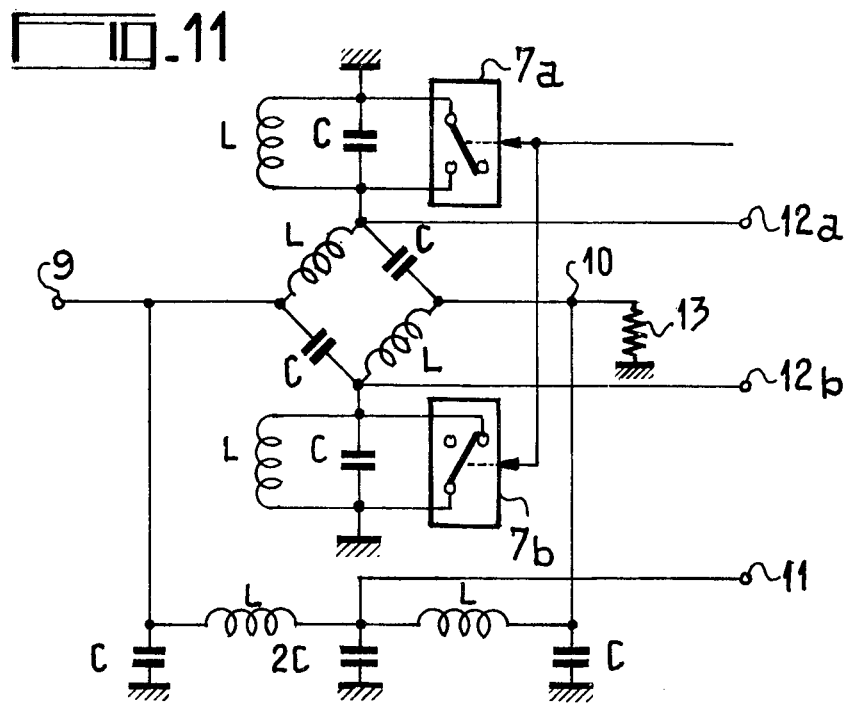
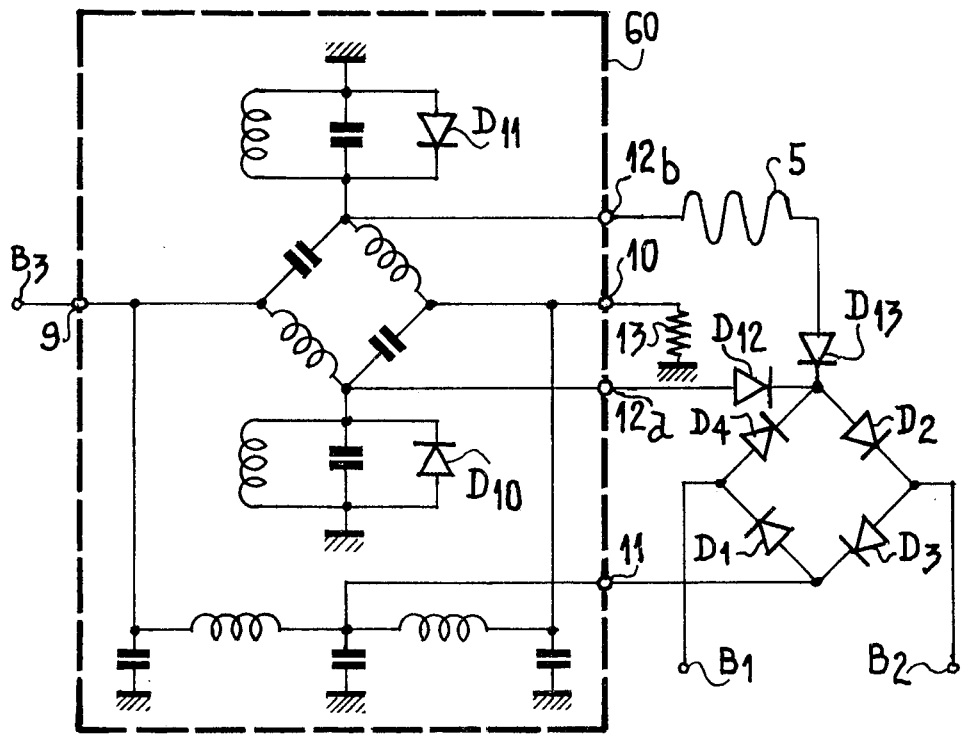

ELECTRONIC SWITCHING ARRANGEMENT FOR A HOMING AND TRAFFIC RADIO SYSTEM

The present invention relates to an electronic switching arrangement for a homing and traffic radio system.

The invention is more particularly applicable to the field of radiolocation and radio transmission and reception on board an aircraft, its object being to provide, on the one hand the function of a radio direction finder of the switchable-diagram type, which is also known as a homing direction finder, and on the other hand a transmission and reception function termed the traffic function.

Homing radio direction finders are items of on-board equipment which are used partciularly in aircraft and which in principle have a fixed orientation with respect to the moving object so that a minimum signal or equality between signals if applicable, is obtained when the direction of transmission coincides with the axis of the moving object. An indicator enables any divergence to be seen. The principle generally employed on VHF or UHF consists in making use of the modulation of the signal which is received by the radiating arrangement, whose principal direction of radiation is switched alternately to right and to left of an axis of symmetry which coincides with the preferred axis of movement of the moving object, which is generally its longitudinal axis. The polar diagram may be of the cardioid type for example and may be rotated through 180° each time a switching operation takes place. There is no modulation of the received signal when the preferred axis of displacement of the moving object coincides with the direction in which the transmitting source lies.

Traffic transmitter/receivers are intended to provide communications in a given range of VHF or UHF frequencies and they generally incorporate a radiating arrangement which is intended to produce an omni-directional or substantially omni-directional radiation diagram.

In conventional homing and traffic installations, the same receiver may be used for both functions, the system comprising generally separate radiating arrangements which are connected to the input of the transmitter/receiver by a suitable coaxial switching arrangement. In the homing position, the receiver is connected to a first radiating device via a second switching arrangement which is intended to reverse the diagram by switching operations, and in the traffic position the transmitter/receiver is connected to a second radiating device.

According to other known homing and traffic systems a single radiating arrangement is common to the two function. The radiating arrangement comprises two antennas which are feed in phase for the traffic mode and with a determined phase-shift for the homing mode. The antennas are at a close distance from each other and the phase-shift device utilized for the homing mode is of the adjustable type to adjust the phase-shift value according to the frequencies in the operation frequence band.

On object of the invention is to realize a switching arrangement which allows operation in a wide frequency range which may attain for example an octave, which allows the operator to select the desired function, be it homing or traffic, at any given time, which allows the diagram to be switched when the homing mode of operation has been selected and which, in conjunction with a single radiating arrangement, enables the respective radiation diagrams for the homing or traffic modes to be produced, as determined by the selection which is made.

In accordance with the invention, there is provided an electronic switching arrangement which is intended to be fitted to a system for homing radio direction-finding and traffic radio transmission and reception, and to connnect in a said system a radiating arrangement having two antennas to a transmitter/receiver to produce the two operating modes, namely homing and traffic, the said switching arrangement comprising: a first and a second terminal for connection to the said antennas respectively; a third terminal for connection to said transmitter/receiver; and switching and phase-shifting means which are connected to the two paths extending respectively from the said first and second terminals to the said third terminal, to make these paths of the same electrical length in the traffic mode and of different lengths in the homing mode by inserting a phase-shifting device in one path and, in this latter mode, to interchange the connections at the ends of the said paths to the said first and second terminals by means of a first double, two-channel switching device, the said phase-shifting device comprising a line element determined to introduce a phase-shif of $(2\pi D)/\lambda$, $\lambda$ being the wavelength and D the distance between the said antennas predetermined at most equal to a quarter of the minimum wavelength of the operating band, and a coupling device of the $0 - \pi$ hybrid junction type for coupling the said paths to the said third terminal while introducting a phase-shift of $\pi$ in the said band in the homing mode and zero phase shift in the traffic mode.

The invention will now be further described with reference to the accompanying drawings, in which:

FIG. 1 is a block diagram of the switching arrangement associated with the antennas and a transmitter/receiver;

FIGS. 2 and 3 show the forms of radiation diagram which need to be produced for the intended homing and traffic functions respectively:

FIGS. 4 to 8 are circuit diagrams relating to an embodiment of the switching arrangement;

FIGS. 10 to 12 are circuit diagrams relating to the second embodiment.

Figure 9:
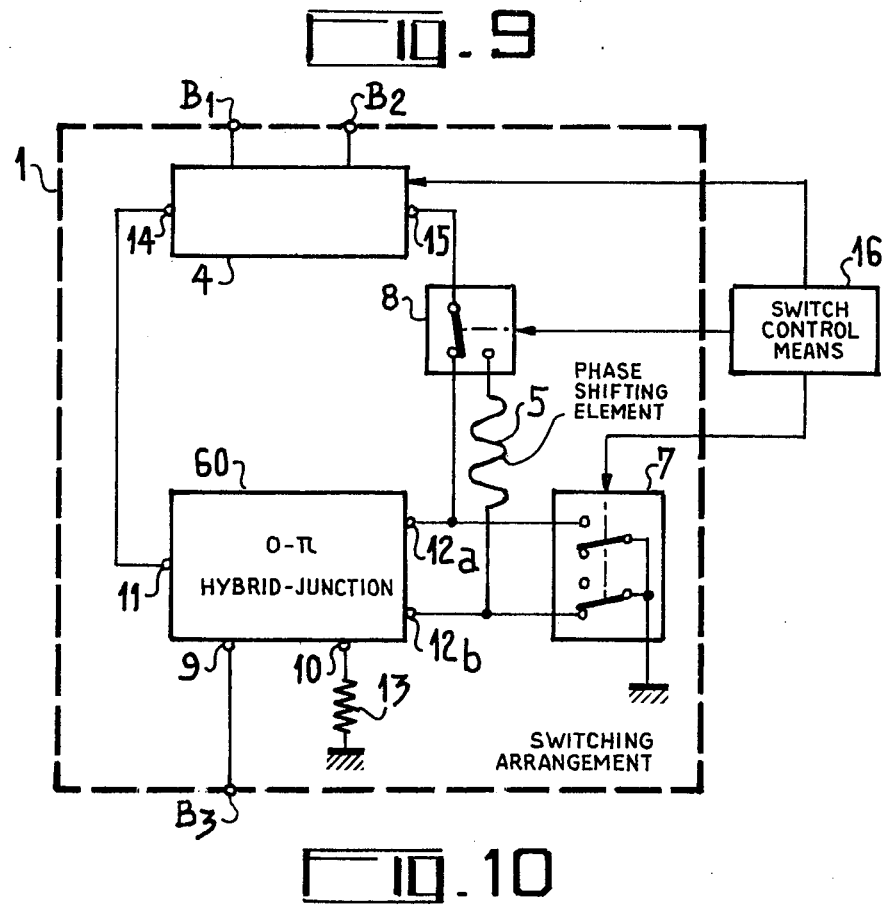
FIG. 9 is a block diagram of a simplified and preferred embodiment of the switching arrangement.

The switching arrangement shown at 1 in the functional diagram of FIG. 1 comprises three terminals. First and second termminals B1 and B2 are intended to be connected to a radiating arrangement, which has two radiating members or antennas A1 and A2. Each member A1 or A2 represents an omni-directional antenna. The distance D between them is made less than or at the most equal to a quarter of the minimum received wavelength envisaged for operations. The switching arrangement 1 allows the two antennas 1 and 2 to be connected separately to the third terminal B3 via two paths which are so determined in respect of their electric length as to create conditions of relative phase which are such as will be explained below. The third terminal B3 is intended to be connected to a transmitter/receiver assembly at 3; which may be formed by an item of on-board equipment of a conventional type which is arranged to provide reception and transmission for the traffic function within the intended range of UHF and/or VHF frequencies, as well as the reception function for homing operations.

The means marked 4 and 5 in FIG. 1 are used in conjunction with antennas A1 and A2 in a first mode of operation for homing radio direction finding.

Antennas A1 and A2, which are of the type mentioned above and which are arranged at a distance D from one another which is defined above, from the radiating arrangement associated with the switching arrangement. Member 5 is formed by a phase-shifting member such as a line member, which is intended to cause a phase-shift of $(2\pi D)/\lambda$ in a received wave of wavelength $\lambda$ in one of the paths between the antenna and the receiver, relative to the other path between the other antenna and the receiver. Under these conditions the maximum phase difference between the paths in $\pi/2$ and the polar diagram is off the cardioid type. The double two-channel switching device 4 enables the connections to the two paths extending from B1 and B2 to be reversed, the result of which is a reversal by $\pi$ of the diagram in direction A1 − A2, and the radiating arrangement becomes bidirectional, the principal direction of radiation being in the sense A1 to A2 for a first switched condition of switch 4 and then in sense A2 to A1 for its second switched condition. Phase-shifting member 5 is inserted in a first path B2 to B3 for a first switched condition and in the second path B1 to B3 for the second switched condition. The reversal of the diagram takes place in relation to an axis of symmetry Y which lies in the centre plane between A1 and A2, as shown in FIG. 2, the direction X being that from terminal B1 to terminal B2 if the terminals are considered to form ends of antennas A1 and A2 respectively.

The switching arrangement 1 includes additional switching and phase-shifting means, as well as coupling means, so as to produce, in conjunction with one and the same radiating arrangement, a diagram of the omnidirectional type as shown in FIG. 3 which is suitable for use in the traffic mode. These additional elements consist of a hybrid junction 6 and switching devices 7 and 8. In particular, the hybrid junction 6 enables the paths from terminals B1 and B2 to be coupled to a single path which is connected via switch 7 to terminal B3. The double, two-channel switching device 7 allows whichever of the homing and traffic modes is desired to be selected and is actuated simultaneously with the single two-channel switching device 8. The latter allows the phase-shifting member 5 to be switched out of the path concerned when the traffic mode is selected. In the traffic mode, the two paths formed between terminals B1 and B2, and terminal B3, are of the same electrical length, which allows an omnidirectional radiation diagram of the type shown in FIG. 3 to be obtained.

The hybrid junction 6 is of the $0 - \pi$ type to produce a phase-shift of $\pi$ in the homing mode and of zero in the traffic mode. A signal applied to one of the terminals marked 9 and 10 is divided between the outputs represented by terminals 11 and 12, which form 3 dB outputs. When the input is to terminal 9 the signals at outputs 11 and 12 are in phase and when the input is to terminal 10 output 12 is out of phase by $\pi$ with respect to output 11. Operation is reciprocal and the signals which come from the antennas and which are applied at 11 and 12 respectively are in phase at output 9 or out of phase by $\pi$ at output 10 depending upon whether the traffic or homing mode is selected. Whichever one of terminals 9 or 10 is not connected to the transmitter/receiver is connected to a matched load 13.

Operation is as follows; in the traffic mode (which is shown) the unused switch 4 may be in either of its two conditions and the paths from terminals B1 and B2, which pass in the one case through switch 4 to terminal 11 of hybrid junction 6 and in the other case through switches 4 and 8 to terminal 12 of the junction, are so determined as to be of the same electrical length. The paths are coupled to output 9 by the hybrid junction, which is connected via switch 7 to terminal B3 and thence to a transmitter/receiver downstream. The fourth terminal 10 of hybrid junction 6 is connected by switching device 7 to the matched load 13. In this mode of operation the hybrid junction 6 causes no phase-shift between the two paths from terminals B1 and B2 to terminal B3. FIG. 1 shows traffic reception operation terminal B3 being assumed to be connected to a receiver at 19. For transmission, the switching situation is unchanged, except that terminal B3 is connected to a transmitter at 18. A single two-channel switching device 17 allows an operator to select transmission or reception in the traffic mode of operation.

To arrive at the homing mode of operation, switching device 17 is assumed to be set to the reception position in which terminal B3 is connected to receiver 19, and switching devices 7 and 8 are operated simultaneously to move from the aforesaid switched condition for traffic to the switched condition for homing. In addition, switching device 4 is then so operated as to reverse the diagram by $\pi$ each time it switches. Switching device 7 connects terminal B3 to terminal 10 of hybrid junction 6 and terminal 9 to load 13, whilst switching device 8 connects terminal 12 of junction 6 to terminal 15 of switching device 4 through the phase-shifting member 5. In this case hybrid junction 6 causes an additional shift by $\pi$ on this latter path and the phase difference of the paths from B1 and B2 to terminal B3 becomes $\pi + (2\pi D)/\lambda$. The diagram is of cardioid form and a phase difference of this size allows operation in a wider frequency band than in cases where the phase difference is one of $2\pi D/\lambda$ the operating band easily attaining an octave.

The switching devices 4, 7 and 8 are of the electronically controlled type and are preferably formed by semiconductor components such as solid-state diodes. Switching device 17 may be of the same type or may be a manual type controlled by the operator. Circuit 16 represents the means for operating the diode switches and may be assumed to be incorporated in the transmitter/receiver assembly, as shown, since it has manual controls for selecting the operating and diagram-switching modes, which need to be within the reach of the operator.

Thus, in the traffic mode, switching assembly 1 produces paths of the same electrical length between terminals B1 and B3, and B2 and B3, with antennas A1 and A2 producing a radiation diagram of the omnidirectional type in this case. In the homing mode it produces a phase difference of $\pi + (2\pi D)/\lambda$ on one of the paths, B2 to B3 in the case shown, and then on B1 to B3 after switch 4 has changed position, the diagram being bidirectional.

A first embodiment of the switching arrangement 1 is described below with reference to FIGS. 4 to 8. FIG. 4 shows embodiments of switching devices 4 and 7 in the form of bridges of four semiconductor diodes, switching device 8 having three diodes. With switches 4 and 7 in a first switched condition, two diodes on two opposing sides, such as D1 and D2, are conductive; whereas the other two diodes, D3 and D4, on the two other opposing sides are non-conductive. Conversely, the second switched condition is represented by diodes D3 and D4 being in the conductive state and diodes D1 and D2 in the blocked state. When switch 8 is in a first condition D5 is conducting and D6 and D7 are in the blocked state, and vice versa after the switch changes its condition.

FIG. 5 shows the hybrid junction 6, which contains three lowpass filters 25, 26 and 27 and a high-pass filter 28. The low-pass filters are formed by $\pi$ networks consisting of an inductance of value L and two capacitors of value C, whilst the high-pass filter is formed by a T network consisting of the same components differently arranged. By way of example the values of the components may be as follows: L = 30 mH and C = 7.6 pF for operations in a band centred on 300 MHz. Each network causes a phase-shift of $\pi/2$ in the centre of the operating band, which is + $\pi/2$ in the case of a lowpass network and − $\pi/2$ in the case of a high-pass network. The inductive and capacitive components may be arranged as shown in FIG. 6, where there are now only ten separate elements. FIG. 7 relates to a corresponding embodiment in which the capacitors of the low-pass networks and the connections are produced by photo-etching one face of a double-faced metallised ceramic substrate 30. The metallised face 31 is connected to the earth reference potential and, after photo-etching (or silk screening), forms with the second face two capacitive elements of value 2C and two capacitive elements of value C. A thinner substrate member 32 which is metallised on one face is added to the circuit to form the two capacitive elements of value C for the high-pass filter. Inductive elements such as 33, which are attached to the circuit by soldering, represent the inductive elements of value L in FIG. 6.

By way of example, FIG. 8 shows the circuit of FIG. 4 complete with its circuits for controlling the diodes. These circuits are produced in a known way and use two DC sources 35 and 36 to bias the diodes to the required conductive or blocked state and inductive and capacitive members to decouple the biasing circuits and the transmission/reception circuit. The capacitive elements which are connected in series with the paths from B1 and B2 to B3 form short circuits for UHF or VHF waves and an open circuit for the steady biasing wave. The inductive members present a high impedance to UHF and VHF waves but allow the biasing current to pass. For the sake of simplicity the capacitive and inductive members are not referenced and are drawn in light lines to distinguish them from the working circuit. A switching device which is shown at 37 allows the diagram to be switched by reversing the polarities of B4 and B5. A second switch which is shown at 38 allows whichever of the traffic or homing modes is required to be selected and causes the polarities at B6 and B7 and B8 and B9 to be reversed. The circuits described above as connected to terminals B4 to B9 correspond respectively, in pairs, to the control means for the switching devices 4, 7 and 8 which are shown diagrammatically in FIG. 1.

FIGS. 9 to 12 relate to a simplified and preferred embodiment of the switching arrangement which enables the number of diodes to be reduced. A functional block diagram of this modified switching arrangement 1 is shown in FIG. 9. The hybrid junction 60 is specially arranged to have its terminal 9 permanently connected to terminal B3 and its second terminal 10 connected to matched load 13, and to have three output terminals 11, 12a, 12b. Terminal 11 is connected to the output terminal 14 of switching device 4 as before. Output terminal 15 of switch 4 is connected to one or other of terminals 12a and 12b by switching device 8, depending upon whether the selected mode of operation is the traffic mode or the homing mode. The electrical lengths of the paths formed between terminals B1, B2 and terminal B3 exhibit the same characteristics as in the previous embodiment. Switching device 7 in this version is arranged in parallel with outputs 12a and 12b and connects the unused output to earth.

Figure 10:
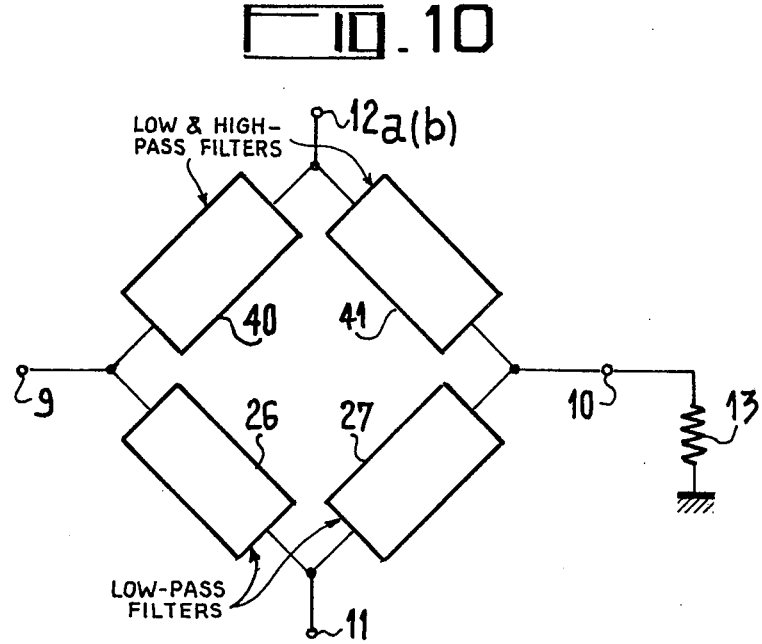

FIG. 10 illustrates the principle of operation of hybrid junction 60. Sides 11 to 9 and 11 to 10 contain low-pass filters of the type shown in FIG. 5 at 26 and 27 and the two other sides of the junction contain members 40 and 41 one of which is a low-pass filter of the same type and the other of which is a high-pass filter formed by a $\pi$ network consisting of two inductive elements L and a capacitive element C. Depending upon the mode of operation which is selected, these two latter filters are interchanged between the upper sides. For the traffic mode member 40 is a low-pass filter and member 41 a high-pass filter and the reverse is the case when the homing mode is selected. The changeover is made by means of switching circuit 7.

A circuit diagram for hybrid junction 60 is shown in FIG. 11, where the said switching device 7 is broken down into parts 7a and 7b. For reasons of simplicity the inductive and capacitive elements are indicated as before by their respective value L and C. That terminal 12a or 12b which is unused in the mode of operation selected is connected to earth reference potential by one of the switching devices 7a and 7b. The position of changeover switches 7a and 7b shown in the Figure corresponds to the traffic mode, with output taking place via terminals 12a and 11 when a transmission signal is applied to terminal 9 and vice versa at reception, terminal 12b being connected to earth by switching device 7a. In the case of operation in the homing mode, terminals 12b and 11 form inputs and terminal 9 the output connected to the receiver, terminal 12a being connected to earth by switching device 7a. The hybrid junction 60 may be produced in a compact form by photo-etching in a similar way to that described for FIG. 7.

The complete switching arrangement 1 is shown in FIG. 12. Switching devices 7a and 7b are formed by semiconducteur diodes D10 and D11 respectively. Switching circuit 8 is formed by two diodes marked D12 and D13. In the traffic mode diodes D10 and D13 are biased to be in the non-conductive or blocked state whereas diodes D11 and D12 are biased to be in the conductive state. In the homing mode these states are interchanged. The circuits for controlling the diodes are not shown for reasons of simplicity.

An antenna switching arrangement according to the invention allows radiating elements to be used which are common to both the homing and the traffic functions and it makes it possible to dispense with the coaxial switching device which is necessary when there are separate radiating elements. The two functions can be provided throughout the entire UHF and VHF frequency band which is selected, which band may cover an octave. The operating frequency is not restricted to these bands provided that the component parts are adapted to suit. It is understood that in cases where homing/traffic equipment is produced the associated transmitter/receiver will allow both functions to be provided. Referring to FIG. 1, such equipment has a conventional UHF-VHF transmitter/receiver formed by a transmitter 18, a receiver 50, a transmission/reception switch 17, and a device to make use of the received signal in the traffic mode such as headphones 52 or a loudspeaker. In addition, receiver assembly 19 has, downstreamm of the receiver proper 50 which is common to both functions, a circuit 53 to handle the reception signal in the homing mode, and a switching device 51 which may be actuated simultaneously with switches 7 and 8. Switch 51 allows the output of the receiver to be connected to the appropriate user circuit. The user circuit 53 which is employed in the homing mode may be produced by known techniques so as to give, for example, a visual indication of divergence between the direction of the preferred axis of movement of the moving object and direction Y (FIG. 2).

The two antennas are aligned perpendicularly to the preferred axis of movement of the moving object to which they are fitted. When the antennas are fed in phase, the diagram obtained is attenuated along both halves of axis X (FIG. 3). This attenuation is less noticeable the smaller the electrical separation between the antennas. In the case of the envisaged distance D the maximum attenuation is 3dB in these directions with respect to direction Y, which is tolerable if a proper traffic function is to be provided. The antennas associated with the switching arrangement may in particular be of the quarter-wave, whip or sword type.

The fact that the antennas are connected to the transmitter/receiver through a $0 - \pi$ hybrid junction allows the antennas to be decoupled from one another, which prevents the diagrams being upset as a result of interantenna reaction through their supply circuits. The hybrid junction allows a substantially constant phase difference of $\pi$ to be provided in the maximum operating frequency band envisaged. The junction may be formed from networks of types other than those indicated but in this case its operating characteristics are less good in the particular UHF-VHF range envisaged.

The solid-state switching diodes are selected to have characteristics such that they can withstand the voltages due to transmitted power in the blocked state and in the conductive state are of low dynamic resistance. In the context of the embodiments described, the solid-state switching diodes are advantageously mounted directly on a ceramic substrate to facilitate heat dissipation.

What is claimed is:

1. An electronic switching arrangement which is intented to be fitted to a system for homing radio direction-finding and traffic radio transmission and reception, and to connect in a said system a radiating arrangement having two antennas to a transmitter/receiver to produce the two operating modes, namely homing and traffic, the said switching arrangement comprising: a first and a second terminal for connection to the said antennas respectively; a third terminal for connection to the said transmitter/receiver; and switching and phase-shifting means which are connected to the two paths extending respectively from the said first and second terminals to the said third terminal, to make these paths of the same electrical length in the traffic mode and of different lengths in the homing mode by inserting a phase-shifting device in one path and, in this latter mode, to interchange the connections at the ends of the said paths to the said first and second terminals by means of a first double, two-channel switching device, the said phase-shifting device comprising a line element determined to introduce a phase-shift of $(2\pi D)/\lambda$, $\lambda$ being the wavelength and D the distance between the said antennas predetermined at most equal to a quarter of the minimum wavelength of the operating band, and a coupling device of the $0 - \pi$ hybrid junction type for coupling the said paths to the said third terminal while introducting a phase-shift of $\pi$ in the said band in the homing mode and zero phase-shift in the traffic mode.

2. A switching arrangement according to claim 1, wherein the said first switching device is connected by a first output to a first input of the said hybrid junction and simultaneously by a second output to one end of the said phase-shiftiing element, and to a first input of a single two-channel switching device, which latter device is connected by its second input to the other end of the said phase-shifting element and by its output to a second input of the said hybrid junction, the latter having two outputs which are connected to respective ones of two inputs of a second double, two-channel switching device, which is connected by its two outputs to the said third terminal and to a matched load respectively.

3. A switching arrangement according to claim 2, wherein the said hybrid junction contains inductive elements and capacitive elements to form three low-pass filters of the $\pi$ networks and a high-pass filter of the T network type which are connected in series to produce four sides of a bridge between respective pairs of the said inputs and outputs of the hybrid junction, the said high-pass filter forming the side which runs from the said second input to one of the outputs of the hybrid junction.

4. A switching arrangement according to claim 1, wherein the said first switching device is connected by a first output directly to a first input of the said hybrid junction and by a second output to the input of a single two-channel switching device, which latter is connected by a first output to a second input of the hybrid junction and by its second output to a third input of the said hybrid junction, via the said phase-shifting element, the said hybrid junction having a first output connected to the said third terminal and a seccond output connected to a matched load, the said second and third inputs of the junction being connected to respective ones of two inputs of a second double two-channel switching device whose two outputs are connected to the earth reference potential.

5. A switching arrangement according to claim 4, wherein the said hybrid junction is formed by inductive elements and capacitive elements to form on the one hand two low-pass filters of the $\pi$ network type which are connected respectively between the said first input and the said first and second outputs of the junction, and on the other hand, in conjunction with the said second double, two-channel switching device to form a low-pass filter and a high-pass filter each of the network type which are connected in series between the said first output and the said second output and whose common points forms the said second input when the said associated switching devices are in a first switched condition and the said third input when they are in the second switched condition, the appropriate unused input being connected in each case to the earth reference potential by the said second switching device.

6. A switching arrangement according to claim 5, wherein the said hybrid junction contains capacitive elements which are produced by photo-etching a double-faced metallised ceramic substrate.

7. A switching arrangement according to claim 6, wherein the switching means comprises switching devices of the electronically controlled type which are produced by means of semiconductor diodes and control means which produce the voltages or biasing the diodes corresponding the mode selected.

8. A system for homing radio direction-finding and traffic radio transmission and reception which incorporates a switching arrangement according to claim 7 and in which the radiating arrangement is formed by two antennas of the isotropic type which are connected at one end to the said first and second terminals respectively and which are situated at a distance from one another equal to a quarter of the minimum operating wavelength envisaged, the said third terminal being connected to a transmitter/receiver unit.

* * * * *